No. 804,779. PATENTED NOV. 14, 1905.
G. W. SOULÉ.
STACKER.
APPLICATION FILED SEPT. 17, 1904.
6 SHEETS—SHEET 1.
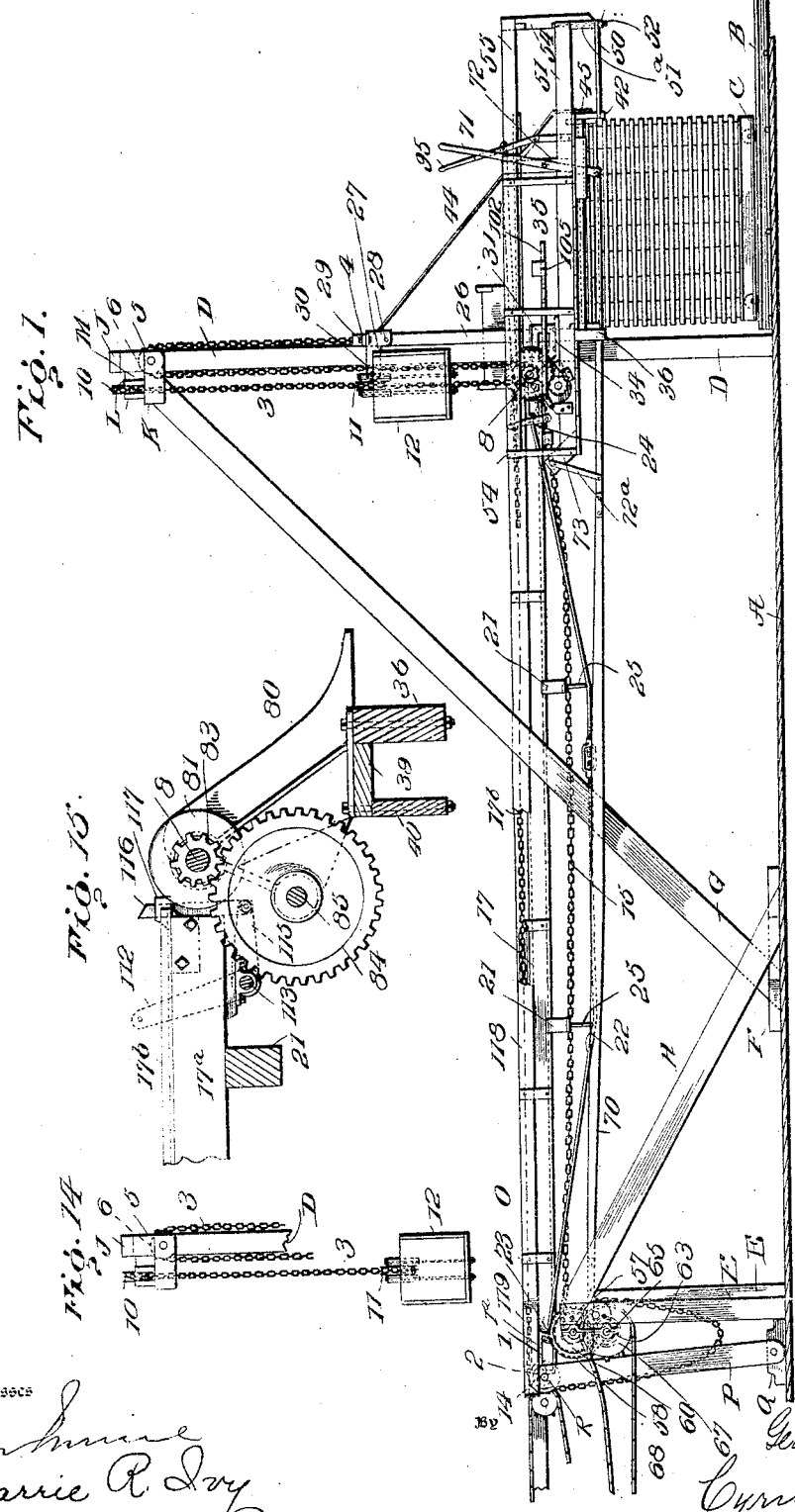
Witnesses
Inventor
George W. Soulé
Attorney

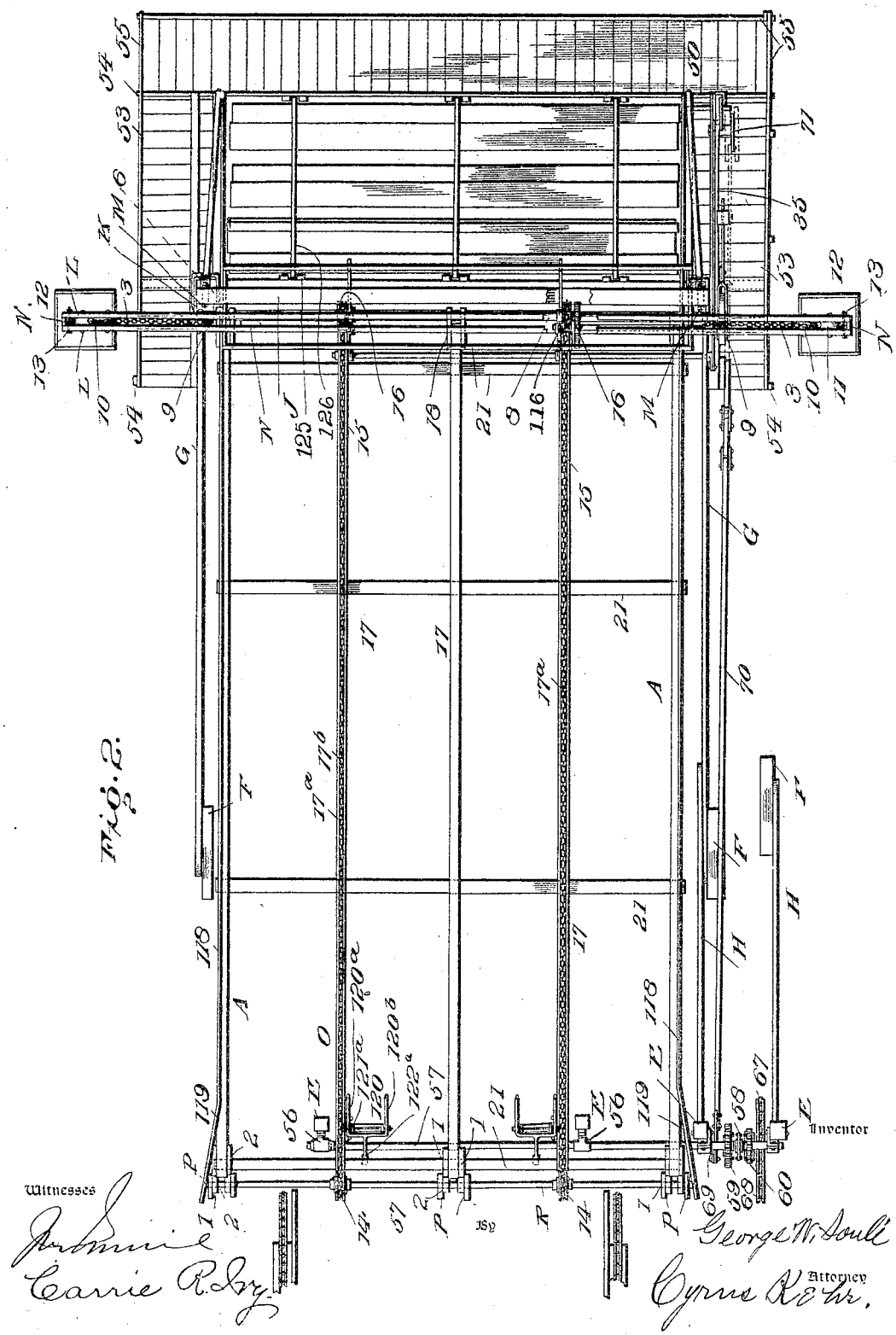

No. 804,779. PATENTED NOV. 14, 1905.
G. W. SOULÉ.
STACKER.
APPLICATION FILED SEPT. 17, 1904.
6 SHEETS—SHEET 3.
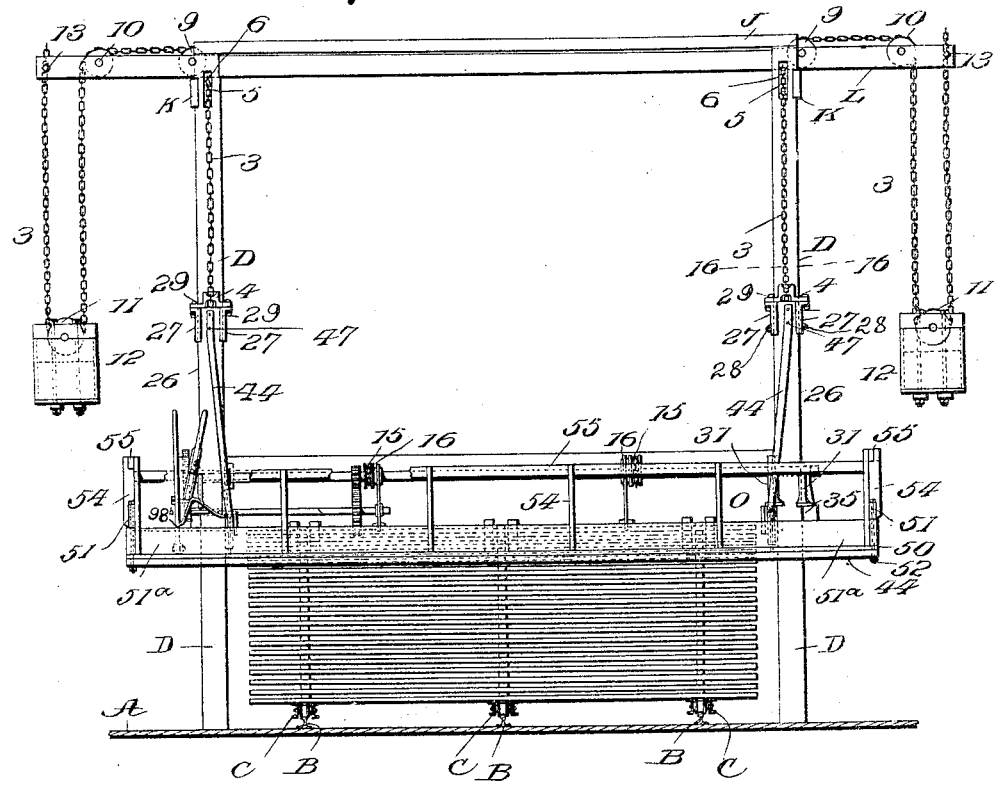
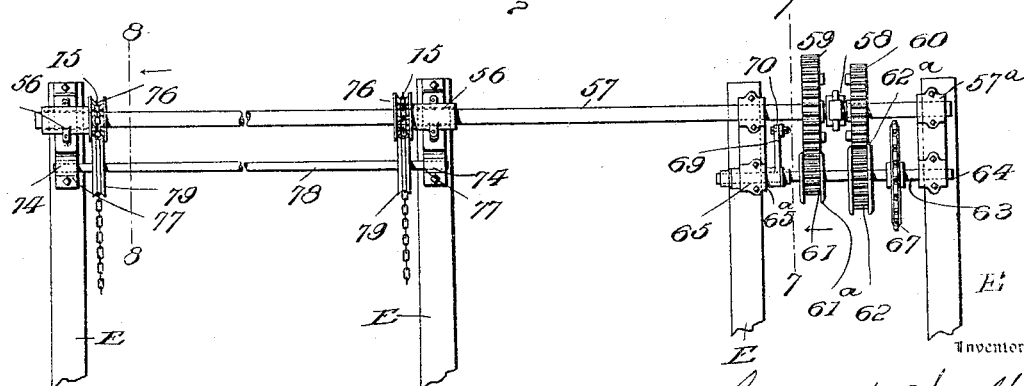

No. 804,779. PATENTED NOV. 14, 1905.
G. W. SOULÉ.
STACKER.
APPLICATION FILED SEPT. 17, 1904.
6 SHEETS—SHEET 4.
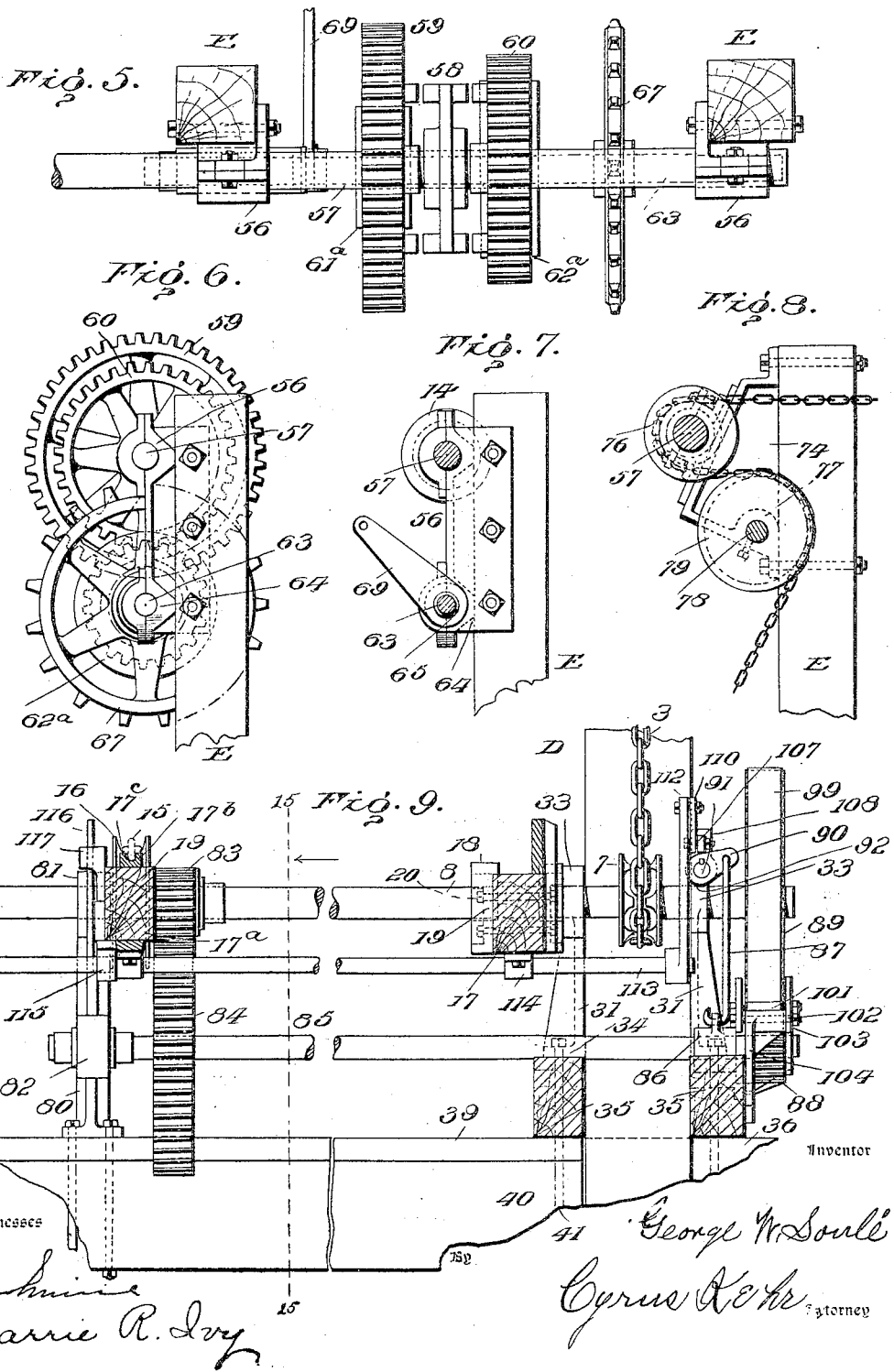

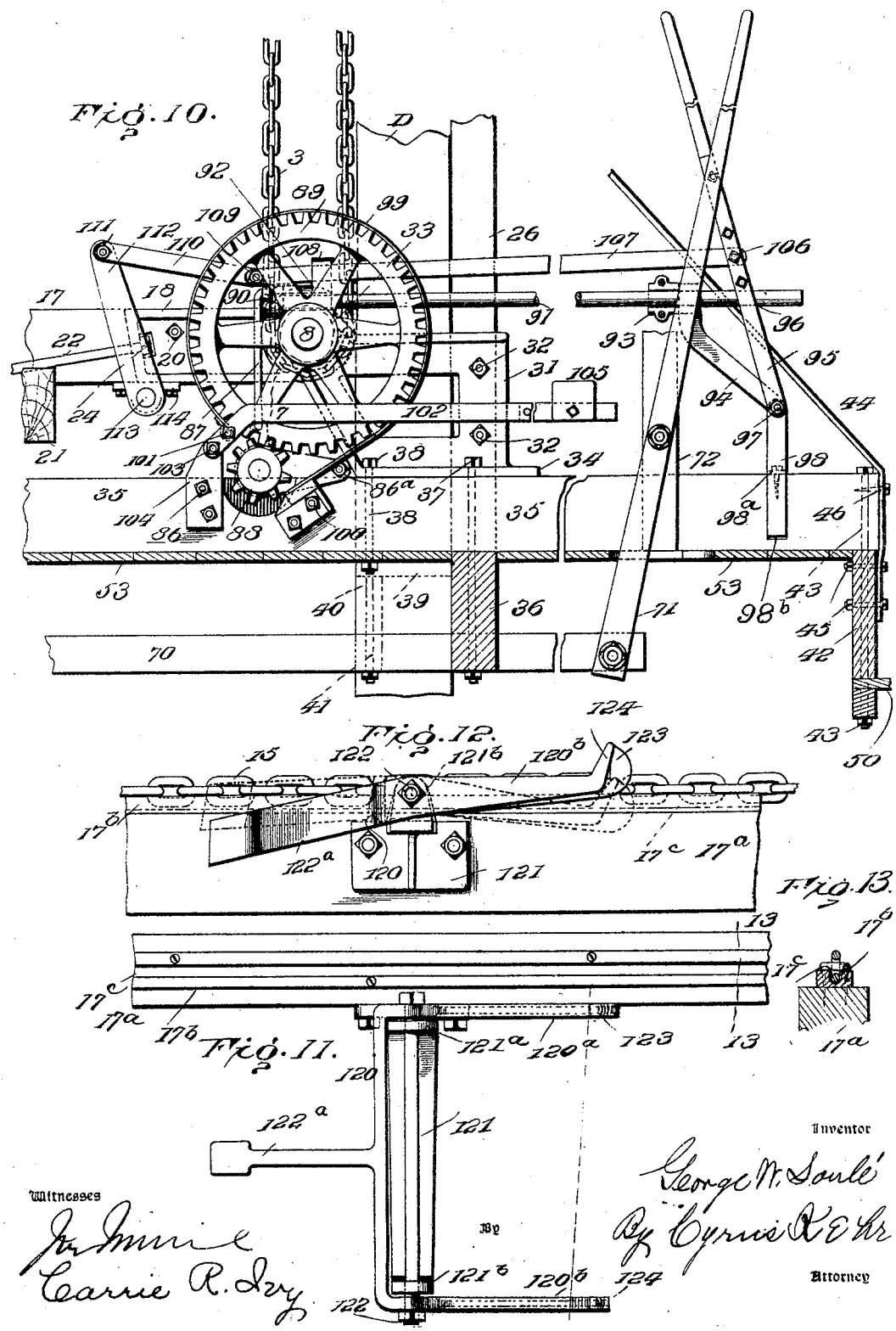

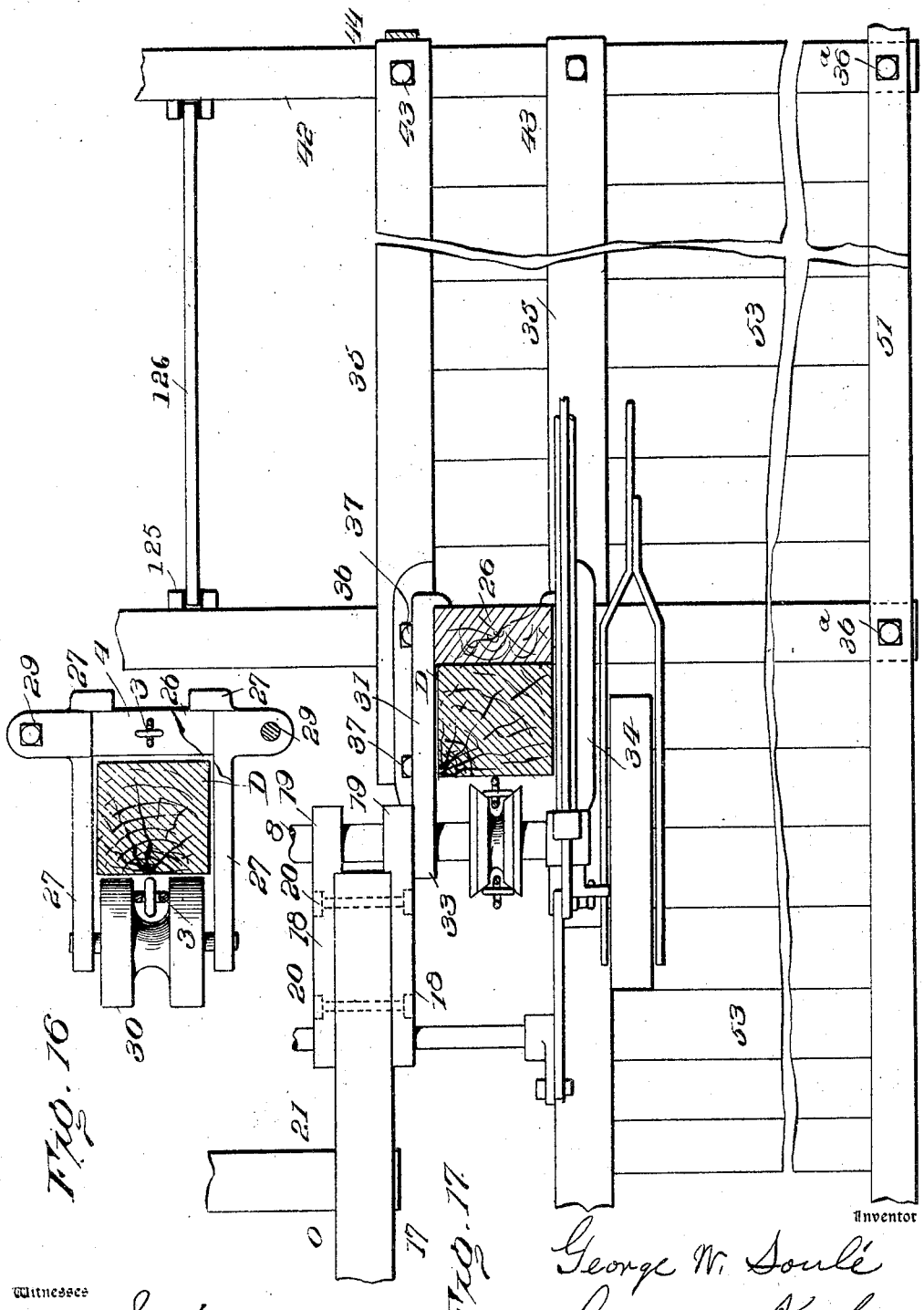

UNITED STATES PATENT OFFICE.

GEORGE W. SOULÉ, OF MERIDIAN, MISSISSIPPI.

STACKER.

No. 804,779.  Specification of Letters Patent.  Patented Nov. 14, 1905.

Application filed September 17, 1904. Serial No. 224,837.

*To all whom it may concern:*

Be it known that I, GEORGE W. SOULÉ, a citizen of the United States, residing at Meridian, in the county of Lauderdale and State of Mississippi, have invented a new and useful Improvement in Stackers, of which the following is a specification, reference being had to the accompanying drawings.

My improvement relates particularly to lumber-stackers which are designed for piling lumber with the pieces arranged flatwise in horizontal layers, as distinguished from the placing of the pieces of lumber edgewise in upright layers. The lumber may be piled upon trucks such as are used for placing lumber into driers, or upon any other vehicle, or upon the ground.

The object of the invention is to produce an apparatus which will operate rapidly and which is to a large extent automatic and which may be easily regulated and put into and out of operation.

The apparatus comprises a stationary frame and a vertically-adjustable conveyer-frame supported by said stationary frame in proper manner to receive lumber from trimmer-chains or similar delivery devices and convey it to the truck or trucks or other support intended to receive the pile of lumber, the end of the conveyer-frame adjacent to the pile being adapted to rise as the pile of lumber grows in height. Upon said conveyer-frame are located conveyer-chains, which engage and move the lumber, and the machine preferably embodies driving-gear adapted to drive said conveyer-chains at different speeds.

The machine also comprises mechanism for automatically raising the discharge end of the conveyer-frame at a speed equaling the most rapid rising of the pile of lumber and manual mechanism for interrupting said lifting mechanism when the conveyer-frame rises too rapidly.

In the accompanying drawings, Figure 1 is a side elevation of an apparatus embodying my improvement. Fig. 2 is a plan of said apparatus. Fig. 3 is an elevation of the discharge end of the same apparatus. Fig. 4 is a detail front elevation of power-transmitting mechanism located at the right-hand front portion of the machine, (the left-hand front corner in Fig. 2.) Fig. 5 is a plan of the same mechanism. Fig. 6 is an end elevation of the same mechanism. Fig. 7 is a vertical cross-section on the line 7 7 of Fig. 4 looking in the direction of the arrow. Fig. 8 is a section on the line 8 8 of Fig. 4 looking in the direction of the arrow. Fig. 9 is a detail sectional elevation taken a short distance in front of the right-hand main post D to illustrate the gear connection between the conveyer-chains and the chains by which the discharge end of the conveyer-frame is raised. Fig. 10 is a detail elevation of the rear portion of the right-hand side of the machine. Fig. 11 is a detail plan of one of a pair of lumber-straighteners. Fig. 12 is a side elevation of the straightener shown by Fig. 11. Fig. 13 is a section on the line 13 13 of Fig. 11 looking in the direction of the arrow. Fig. 14 is a detail of the mechanism for counterbalancing the conveyer-frame. Fig. 15 is a section on the line 15 15 of Fig. 9. Fig. 16 is a section on the line 16 16 of Fig. 3. Fig. 17 is a detail plan of the structure surrounding the right-hand main supporting-post D, portions of the mechanism being cut away.

For the sake of convenience the receiving end of the machine is herein termed the "front" end of the machine, while the discharge end is termed the "rear" end of the machine, and "forward" is used to designate toward the receiving end and "rearward" to designate toward the discharge end, and the side of the machine at the right hand when the machine is viewed looking from the receiving end toward the discharge end is termed the "right-hand" side, while the opposite side is termed the "left-hand" side.

Referring to said drawings, the stationary frame of the machine is constructed as follows: A A are horizontal sills or plates. D D are relatively high main upright posts located at the rear of the machine in a plane which is upright and transverse to the length of the machine and at a proper distance from each other to make room for the conveyer-frame to extend between them. E E E E are supporting-posts located in substantially a transverse row at the receiving end of the machine. These posts do not extend above the conveyer-frame, and their function is to support driving shafts and gearing, as will be hereinafter described. A brace G extends from each main post D forward and obliquely downward to an anchor-block F, to which it is secured. A similar brace H extends from each of the two right-hand posts E toward the rear or discharge end of the machine and obliquely downward to anchor-blocks F. Obviously the other posts E may be provided with similar braces, if so desired. A horizontal beam or plate J extends across the upper ends of the main posts D and is secured to said ends. From each main post D, near the upper end of the latter, a horizontal bracket K extends toward the front end of the machine. Upon said brackets rest two parallel beams L L, secured to said brackets. The beam L adjacent to said posts is further stayed by a block M, interposed between said beam and each post D, and said beams L may be joined to each other by spacing-blocks N.

B B are track-rails located at the rear of the machine, and C C are trucks located upon said rails in proper position to receive a pile or load of lumber to be taken into a drying-kiln.

O is the conveyer-frame. Three pairs of rocking posts P P are arranged in a row transverse to the length of the machine and in front of the row of posts E. Said posts P are hinged by their lower ends to anchor-blocks Q on a common horizontal axis in order that said posts may rock in unison in upright planes parallel to the length of the machine. A horizontal non-rotary shaft R joins the upper ends of said rocking posts. The front or receiving end of the conveyer-frame is supported upon the said rocking posts P by a hinge connection with the said horizontal shaft R, as will be hereinafter described, and the opposite end of the conveyer-frame extends through the space between the main posts D D and is supported at each such post by a chain 3, secured by one end to a plate 4 and extending thence over an upright pulley 5, seated in a mortise 6, extending through the upper portion of the post D. Thence each of said chains extends around a sprocket-wheel 7, surrounding and keyed to a horizontal transverse rotary shaft 8, Figs. 9, 10, and 17, mounted in suitable bearings, as 33 and 81, on the conveyer-frame O immediately in front of the main posts D, as will be hereinafter described. Thence the chain 3 rises and extends over an idle pulley 9, journaled between the beams L L, adjacent to the post D. Thence said chain extends horizontally and parallel to said beams L L to an idle pulley 10, also supported by said beams L L, and thence over said pulley 10 and downward around a pulley 11. Said pulley 11 is journaled in a weight-box 12. Said chain extends beneath said pulley and thence upward to the beams L L and is there immovably secured to a cross-bolt 13, extending horizontally through said beams. Thus the said weight-box is suspended by said chain.

From the foregoing it will be understood that the rotation of the shaft 8 clockwise, as viewed from the right-hand side of the machine, Figs. 1 and 10, will cause the sprocket-wheels 7 to draw the chains 3 downward from the pulley 5, thereby raising the rear or discharge end of the conveyer-frame, and that when the said shaft is rotated or permitted to rotate in the opposite direction said movements of the said chains and said frame will be reversed. The mechanism concerned in effecting the rotation of said shaft 8 will be hereinafter described.

The construction of the conveyer-frame O is as follows: From each pair of rocking posts P P a beam or bar 17 extends horizontally to the discharge end of said frame and to within a short distance of the horizontal shaft 8. At the latter shaft each of said bars is clamped between a pair of bearing-plates 18, having bearings 19, through which said shaft extends. Said plates may be secured to said beam in any suitable manner, as by bolts 20. The front ends of said bars 17 are provided with similar clamping-plates 1, having bearings 2 engaging the shaft R. Beneath the bars 17 four cross bars or beams 21 are secured to said beams 17. Two chain-supporting bars $17^a$ are placed upon the cross-bars 21 parallel to and between the bars 17. The front ends of said bars $17^a$ terminate near the shaft R, and the rear ends of said bars terminate near the shaft 8. Upon the upper face of each of said bars $17^a$ is placed longitudinally a longitudinally-channeled rail or strap $17^b$. The channel $17^c$ of said rail or strap is of proper width and depth to receive the lower portion of the upright links of the chain 15, while the horizontal links of said chain rest flatwise upon the upper face of said rail at each side of said channel. (See Figs. 11, 12, and 13.) Thus the greater portion of the chain is left above said rail to engage the lower faces of the pieces of lumber. At each side of the frame O a truss-rod 22 is secured at 23 to the clamp-plate 1, Fig. 1, while the other end is secured at 24 to one of the bearing-plates 18, Fig. 10. Posts or standards 25 are interposed between the middle cross-beams 21 and the truss-rods. Only one of said truss-rods is shown by the drawings; but as the application of the other of said rods is identical with the one shown further illustration is deemed unnecessary.

From each plate 4 (which have been described as being located at the discharge side of the main posts D and connected with the chains 3) a bar 26, preferably a little wider than the adjacent face of the adjacent post D, rests loosely against said post and extends downward a short distance below the level of the shaft 8 and the beams 17. At the upper end of said bar 26 two guide-plates 27 extend along the opposite sides of said bar 26 and said post and are secured to said bar by bolts 28, Figs. 1 and 3, and to the plate 4 by bolts 29, Figs. 1, 3, and 16. Said guide-plates extend far enough forward of the post D to bear between them a guide pulley or roller 30, said roller being grooved, so as to adapt it to extend partially around the adjacent portion of the chain 3, while the flanges of the roller bear against the post D. A pair of guide members 31 are similarly applied to the lower end of said bar 26 and secured thereto by bolts 32, extending through said members and said bar, and said members extend forward of the adjacent sides of the post D and are there provided with bearings 33, through which the shaft 8 extends. By this means said bar 26 is secured to and supported by the conveyer-frame. Each of the plates 31 has at its lower edge a lateral horizontal flange or foot 34, to which is applied from beneath a horizontal bar 35, the right hand of said bars extending a short distance forward from the post D and both of said bars extending parallel to each other in the opposite direction and terminating just beyond the space to be occupied by the pile of lumber. Immediately at the rear of the posts D a beam 36 is applied transversely from one side of the machine to the other and against the lower faces of the bars 35. Bolts 37 extend through the feet 34, bars 35, and beam 36 and bind said parts to each other. At the outer side of each post D a bolt 38 extends through the adjacent flange 34, the adjacent bar 35, and the floor applied to the lower edge of said bar, as will be hereinafter described.

Between the two posts D and toward the receiving end of the machine a flat bar 39 is arranged horizontally and flatwise and secured by one edge to the upper portion of the adjacent upright face of the beam 36, and another flat bar 40 is arranged edge up and parallel to the beam 36 and with its upper edge bearing against and secured to the front portion of the lower face of the bar 39. (Figs. 9, 10, and 15, --- in Fig. 17, said bars 39 and 40 have been removed.) A bolt 41 extends downward through the adjacent foot or flange 34, the adjacent bar 35, and the bars 39 and 40 and binds said parts firmly together.

A bar 42 extends transversely across the machine beneath the rear ends of the bars 35 and is secured to the latter in any suitable manner, as by bolts 43 extending downward through said bars. Said bar 42 is long enough to permit its ends to project beyond the outer bars 35 sufficiently to constitute a portion of the support for a platform to be hereinafter described. From each of the inner of said bars 35 a strap-form brace 44 is secured by its lower end to the bar 42 by bolts 45 and to the bar 35 by a screw or screw-bolt 46, Figs. 1, 3, and 10, and extends thence obliquely upward to the upper end of the bar 26 and is suitably secured to the latter by means of bolts or screws 47. Said brace serves to more securely join the bar 26 to the remainder of the conveyer-frame. By means of said bar 26 and said guide-plates 31 and 27 and the guide-roller 30, supported by said plates 27, the discharge end of the conveyer-frame is guided vertically upon said main posts D.

A platform or staging upon which the operator may stand is applied to the right and left and rear of the space in which the pile of lumber is to be formed. The ends of the beam 36 project beyond the outer beams 35 as far as the beams 42 project beyond said bars, and a beam 51 is arranged parallel to the beams 35 at each side of the conveyer-frame and upon the outer ends of the beams 36 and 42 and secured to the latter by upright bolts 36ª. (See Fig. 17.) The said beams 51 extend forward a short distance beyond the posts D and rearward of the beam 42 a distance equal to the distance the beams 36 and 42 project beyond the outer bars 35. Beneath the rear ends of said beams 51 a bar or beam 51ª is arranged crosswise of the machine and secured by bolts 52 extending through said beams 51 and 51ª. Flooring 50 is secured to the lower edges of the beams 42 and 51ª, and flooring 53 is secured to the lower edges of the beams 51 and the adjacent bar 35. Posts 54 arise from the beams 51 and 51ª and support a railing 55 along the exterior of said platform or staging.

On the shaft R, already described as joining the upper ends of the rocking posts P, are two loose pulleys 14, one opposite the adjacent end of each of the channel-bars 17ª. At the opposite ends of said channel-bars similar pulleys 16 loosely surround the shaft 8. Said pulleys 14 and 16 receive the conveyer-chains 15, as hereinafter described.

In suitable bearings 56 on the front faces of the posts E immediately below the conveyer-frame rests a rotary shaft 57. Said shaft may be driven by a chain or belt applied directly thereto; but I prefer to drive the same with the two-speed gearing located at the right-hand front corner of the machine and illustrated in detail by Figs. 4, 5, and 6. A clutch member 58 is fixed upon said shaft 57 between the two right-hand posts E E, and 59 is a relatively large spur-gear clutch member loosely surrounding said shaft at the left of said clutch member 58. A relatively small spur-gear clutch member 60 loosely surrounds said shaft at the right of said member 58. A counter-shaft 63 rests in bearings 64 and 65, secured to the adjacent posts E E below said shaft 57, and upon said counter-shaft is fixed a relatively small spur gear-wheel 61, meshing with the spur-gear member 59 and having lateral flanges 61ª extending partially over the edges of said member 59, and a similar spur gear-wheel 62, having similar flanges 62ª, is fixed upon said counter-shaft in engagement with the spur-gear member 60. A sprocket-wheel 67 is also fixed upon said counter-shaft and receives a driving-chain 68, Fig. 2.

The bearing 65 is made in the form of a thrust-box and embodies a sleeve 65ª, adapted to receive a quarter-rotation and by such quarter-rotation force the counter-shaft 63 endwise a proper distance to cause the spur gear-wheels 61 and 62 to slide the clutch members 59 and 60 lengthwise upon the shaft 57 far enough to engage one or the other of said members with the clutch member 58, according as the counter-shaft is moved to its limit to the right or to the left. When said counter-shaft is midway between its two limits of movement, both of the clutch members 59 and 60 will be out of engagement with the member 58, and the shaft 57 will not be rotated. As such thrust-boxes are well known in the mechanical arts, I deem it unnecessary to describe the same in detail. From the right-hand end of said sleeve 65ª of the thrust-box 65 rises an arm 69, and to the upper end of said arm is hinged a bar or pitman 70, which extends thence parallel to the adjacent side of the machine to a point beneath the right-hand-side platform at the discharge end of the machine. There it is hinged to the lower end of a hand-lever 71, which is hinged intermediate its ends to a post 72, rising from the adjacent beam 35, the lower end of said lever 71 extending through the adjacent portion of the floor 53, Fig. 10. On account of its length said bar or pitman 70 is supported intermediate its ends by a link 72ª, hinged by its lower end to said pitman and by its upper end to a bracket 73, supported by the adjacent conveyer-frame bar 35. As will be readily understood by an inspection of the drawings, the movement of the upper end of said lever 71 forward and backward will cause the reciprocation of said bar or pitman 70 and the oscillation of said arm 69, the partial rotation of the sleeve of the thrust-box, and the consequent longitudinal shifting of said counter-shaft 63 and the gear-wheels and clutch members supported and controlled by said counter-shaft.

To the upper portion of the front face of each of the left-hand posts E (those which are located adjacent to the chain-supporting bars 17ª) is secured a bracket 74, having the bearings 56, in which rests the shaft 57, and in the lower portion of each of said brackets is another horizontal bearing 77, in which rests a counter-shaft 78. Upon the shaft 57, beneath each bar 17ª, is a grooved pulley 76, secured immovably to said shaft, and in the same planes with said pulleys 76 a grooved pulley 79 is secured around said counter-shaft 78. Each chain 15 extends along the upper face of the adjacent chain-supporting bar 17ª to and around the grooved pulley 16 and thence to the upper portion of the adjacent pulley 76 and around the front and lower portion of said pulley and thence rearward to the upper portion of the pulley 79 and across the latter and thence downward toward the ground and thence forward and upward and over the adjacent pulley 14 to the upper face of the bar 17ª. The portion of the chain between the pulleys 79 and 14 is slack. The shaft 57 and the pulleys 76 are rotated contraclockwise, whereby the portion of the chain 15 below the conveyer-frame is drawn toward said shaft. Obviously this results in drawing the chains around the pulleys 16 from the receiving end toward the discharge end of the machine, the slack portion being constantly lifted to the pulleys 14.

Between the pulleys 16 and adjacent to each of said pulleys a chair 80 rises from the beam 36 and plate 39 and has in its upper portion a bearing 81 for the shaft 8.

As already described, both of the grooved pulleys 16 loosely surround the shaft 8, so as to permit the rotation of said pulleys and said shaft independently of each other. I provide the following-described mechanism for transmitting reduced motion from the right-hand pulley 16 to said shaft: At the right of the right-hand pulley 16 a gear-pinion 83 also loosely surrounds the shaft 8 and is secured to said pulley in order that said pinion must rotate with said pulley when the latter is driven by the chain 15. Beneath and meshing with said pinion 83 is a spur gear-wheel 84, surrounding and fixed upon a counter-shaft 85, which counter-shaft rests by its left-hand end in a bearing 82 with sufficient play to allow the right-hand end of said shaft to be slightly raised and lowered, and by its right-hand end in a bearing 86, hinged at 86ª and suspended from a pitman 87. Said counter-shaft extends to the right of said bearing 86 and is there surrounded by a pinion 88, keyed to said shaft and meshing when in its elevated position with a spur gear-wheel 89, surrounding and keyed to the shaft 8. The pitman 87 is coupled by its upper end to a crank 90, which latter is keyed to a rock-shaft 91, which is horizontal and parallel to the length of the machine and rests in bearings 92 and 93, the former being in the upper portion of the adjacent guide member 31 and the latter being supported on the post 72 adjacent to the hand-lever 71. Immediately behind said post 72 an arm 94 is secured rigidly to said rock-shaft and directed downward and rearward. Rearward of said arm a substantially upright hand-lever 95 is slidably joined to or around said rock-shaft at 96, and the lower end of said hand-lever is hinged at 97 to the lower end of the arm 94 on an axle which is horizontal and transverse to the length of the machine. From the foregoing description it will be understood that tilting said hand-lever 95 to the right or to the left will cause the rocking of said rock-shaft and the raising and lowering of said pitman 87 and the bearing 86, whereby the pinion 88 is put into and out of engagement with the spur gear-wheel 89. In such action the rock-shaft 91 forms a fulcrum for the hand-lever 95. So long as the said pinion 88 is in engagement with the spur gear-wheel 89 motion will be transmitted from the adjacent pulley 16 to the shaft 8, not directly, but through the pinion 83, spur gear-wheel 84, shaft 85, pinion 88, and spur gear-wheel 89. Each of the spur gear-wheels 84 and 89 being larger than the adjacent pinion from which it receives motion, it follows that a reduction of speed takes place in transmission of motion from said pinions to said gear-wheels, so that the grooved pulleys 7 rotate at a much lower speed than do the grooved pulleys 16, and the action of the pulleys 7 in drawing upon or climbing the chain 3 will be much slower than the speed of the chains 15.

Below the lower portion of the hand-lever 95 a locking-spring 98 is attached to the inner beam 35 at $98^a$ and extends thence obliquely upward across the adjacent beam 35, and thence downward outside of said beam 35 and there terminates in an approximately horizontal foot-piece $98^b$. The middle portion of said spring rises above the lower end of the hand-lever 95, so that said spring locks said end of said lever against movement toward the right as viewed in Fig. 3. The spring may be depressed by placing the foot of the operator upon the foot-piece $98^b$. Then said hand-lever may be turned upon the shaft 91, the lower end of said lever going to the right. On releasing the spring 98 it will again rise and bear against the lower end of said hand-lever. Thus said spring serves to lock said hand-lever when the gear-wheels 88 and 89 are in engagement or out of engagement.

A brake-strap 99 surrounds the spur gear-wheel 89 and is secured by one end to a bracket 100, applied to the adjacent beam 35 and attached by the other end at 101 to a lever 102, which is fulcrumed at 103 to a bracket 104, also secured to said beam 35. To the free end of said lever 102 is applied a slidable weight 105, which serves to increase the action of said brake-strap upon said wheel 89, according to the distance of said weight from the fulcrum of said lever. The function of said brake-strap is to automatically retard or prevent the downward movement of the conveyer-frame by its own weight.

At 106 a flexible connecting-rod 107 is hinged by one end to the hand-lever 95, and extends thence horizontally forward through a guide 108, located just above the bearing 92 of the rock-shaft 91. (The flexibility of said rod 107 is sufficient to permit said hand-lever 95 to turn laterally for the rocking of said rock-shaft 91.) At 109 a link 110 is hinged to the front end of said connecting-rod, and the opposite end of said link is hinged at 111 to a crank 112, which crank is secured to a rock-shaft 113, which is horizontal and transverse to the length of the machine and rests in bearings 114 applied to the lower faces of the right-hand bar 17 and the channel-bars $17^a$. Adjacent to each channel-bar $17^a$ an arm 115 extends horizontally from the shaft 113 rearward and terminates opposite the end of said bar, and to the end of said arm is hinged the lower end of an upright stop-bar 116, which extends through a guide-plate 117, secured to the side of the guide-bar, and is adapted to be moved upward so as to project above the adjacent bar $17^a$ and chain 15. The oscillation of the hand-lever 95 upon its hinge 97 will reciprocate the connecting-rod 107, link 110, and rock the arm 112, rock-shaft 113, and arm 115, and vertically reciprocate the stop-bar 116. The dimensions and relations of these parts is such as to normally bring the upper end of the stop-bar 116 below the upper face of the guide 17 and to allow said stop-bar to be raised above said face sufficiently to enter the path of the lumber and arrest the forward movement of the latter upon the conveyer when so desired by the operator, the chains 15 slipping beneath said lumber.

From the foregoing it will be seen that the hand-lever 95 performs a twofold function—namely, to control the engagement of the pinion 88 with the spur gear-wheel 89 and to actuate the stop-bars 116.

The lumber is piled within the rectangular space inclosed by the beams 35 35 and the beams 36 and 42. On the opposing faces of the beams 36 and 42 are secured pairs of upright guide-strips 125. During the operation of the machine the attendant or operator stands upon the platform or upon the pile of lumber and arranges the latter and places the spacing-sticks 126 upon each completed layer of lumber, the ends of said sticks extending between pairs of guide-strips 125, and, as already above stated, by means of the hand-levers 71 and 95 he controls the automatic operation of the machine as to the lifting of the free end of the conveyer-frame and the rapidity of the travel of the conveyer-chains 15 and the delivery of the lumber from the conveyer-chains. The delivery of the lumber is always to be interrupted while a layer is being arranged and a new set of spacing-sticks is being put into position.

From the outer edge of each outer conveyer-framebar 17 rises a guide 118, which extends the entire length of said bar, excepting at the front end said guide extends outward, as shown at 119. The purpose of said guides is to engage the ends of the pieces of lumber as they are presented to the conveyer from the trimmer-chains and aline them endwise and so maintain them while they travel across the conveyer.

For the purpose of straightening the lumber into position transversely to the length of the machine I use the two hinged straighteners 120, (shown in detail in Figs. 11 and 12.) Each such straightener is supported by a bracket-plate 121, secured to the side of the adjacent channel-bar $17^a$, and a horizontal bolt 122, extending transversely through the ears $121^a$ and $121^b$ of said bracket and the arms $120^a$ and $120^b$ of said straightener, said arms being directed toward the rear end of the machine. On the opposite side of said bracket is a weight-arm $122^a$, which is just a little heavier than said arms in order that the latter may normally yieldingly rise into the path of the lumber. The arm 120ª terminates in an upward-directed hook 123, which is adapted to engage and arrest the movement of the lumber. The arm 120ᵇ has an inclined finger 124, the front face of which extends upward and rearward, and it is a little in advance of the front face of the hook 123, so that if the lumber advances in accurately transverse position the forward edge of the lumber will engage only the slanting face of said finger and depresses said finger, and thereby tilt the entire straightener, whereby the hook 123 is depressed out of the path of the lumber; but if the lumber advances slanting the forward edge of the advance end of the lumber will first engage the hook 123 of the adjacent straightener and be held by said hook until the opposite end of the piece of lumber advances sufficiently to nearly straighten said piece. During this latter movement the forward edge of the advance end of the piece of lumber engages the finger 124 and gradually depresses it until the piece of lumber is straight, by which time the hook 123 has been sufficiently depressed to effect a disengagement of the lumber. In each straightener the arm 120ª, bearing the hook 123, is located at the side of the straightener toward the adjacent side of the machine.

I claim as my invention—

1. In a stacker, the combination with an approximately horizontal conveyer-frame, of supporting mechanism to which the front end of said frame is hinged, automatic mechanism for lifting the rear end of said frame simultaneously with the operation of the conveyer mechanism, manual mechanism for interrupting the operation of said lifting mechanism, and manual mechanism for varying the speed of the conveyer mechanism, substantially as described.

2. In a stacker, the combination with an approximately horizontal conveyer-frame, of supporting mechanism to which the front end of said frame is hinged, automatic mechanism for lifting the rear end of said frame simultaneously with the operation of the conveyer mechanism, manual mechanism for interrupting the operation of said lifting mechanism, manual mechanism for varying the speed of the conveyer mechanism, and manual mechanism for interrupting delivery from the conveyer mechanism, substantially as described.

3. In a stacker, the combination with an approximately horizontal conveyer-frame, of supporting mechanism to which the front end of said frame is shiftably hinged, upright guides for the rear end of said frame, automatic mechanism for lifting the rear end of said frame simultaneously with the operation of the conveyer mechanism, manual mechanism for interrupting the operation of said lifting mechanism, and manual mechanism for varying the speed of the conveyer mechanism, substantially as described.

4. In a stacker, the combination with an approximately horizontal conveyer-frame, of supporting mechanism to which the front end of said frame is shiftably hinged, upright guides for the rear end of said frame, automatic mechanism for lifting the rear end of said frame simultaneously with the operation of the conveyer mechanism, manual mechanism for interrupting the operation of said lifting mechanism, manual mechanism for varying the speed of the conveyer mechanism, and manual mechanism for interrupting delivery from the conveyer mechanism, substantially as described.

5. In a stacker, the combination with an approximately horizontal conveyer-frame, of supporting mechanism to which the front end of said frame is hinged, conveyer-chains applied to said frame, mechanism in operative relation with one of said conveyer-chains for raising the rear end of said frame, and manual mechanism for varying the speed of said chains, substantially as described.

6. In a stacker, the combination with an approximately horizontal conveyer-frame, of supporting mechanism to which the front end of said frame is hinged, conveyer-chains applied to said frame, mechanism in operative relation with one of said conveyer-chains for raising the rear end of said frame, manual mechanism for interrupting the operation of said lifting mechanism, manual mechanism for varying the speed of the conveyer mechanism, and manual mechanism for interrupting delivery from the conveyer-chains, substantially as described.

7. In a stacker, the combination with an approximately horizontal conveyer-frame, of supporting mechanism to which the front end of said frame is shiftably hinged, upright guides for the rear end of said frame, conveyer-chains applied to said frame, and mechanism in operative relation with one of said conveyer-chains for raising the rear end of said frame, substantially as described.

8. In a stacker, the combination with an approximately horizontal conveyer-frame, of supporting mechanism to which the front end of said frame is shiftably hinged, upright guides for the rear end of said frame, conveyer-chains applied to said frame, mechanism in operative relation with one of said conveyer-chains for raising the rear end of said frame, and manual mechanism for interrupting the operation of said lifting mechanism, substantially as described.

9. In a stacker, the combination with an approximately horizontal conveyer-frame, of supporting mechanism to which the front end of said frame is shiftably hinged, upright guides for the rear end of said frame, conveyer-chains applied to said frame, mechanism in operative relation with one of said conveyer-chains for raising the rear end of said frame, manual mechanism for interrupting the operation of said lifting mechanism, and manual mechanism for interrupting delivery from the conveyer-chains, substantially as described.

10. In a stacker, the combination with an approximately horizontal conveyer-frame, of supporting mechanism to which the front end of said frame is shiftably hinged, upright guides for the rear end of said frame, conveyer-chains applied to said frame, mechanism in operative relation with one of said conveyer-chains for raising the rear end of said frame, manual mechanism for interrupting the operation of said lifting mechanism, and manual mechanism for varying the speed of said conveyer-chains, substantially as described.

11. In a stacker, the combination with an approximately horizontal conveyer-frame, of supporting mechanism to which the front end of said frame is shiftably hinged, upright guides for the rear end of said frame, conveyer-chains applied to said frame, mechanism in operative relation with one of said conveyer-chains for raising the rear end of said frame, manual mechanism for interrupting the operation of said lifting mechanism, manual mechanism for varying the speed of the conveyer mechanism, and manual mechanism for interrupting delivery from the conveyer-chains, substantially as described.

12. In a stacker, the combination with the conveyer-frame and conveyer-chains, of a driving-shaft, 57, a counter-shaft, 64, two-speed gear and clutch mechanism applied to said shafts, a hand-lever, and mechanism connecting said hand-lever and gear-and-clutch mechanism, substantially as described.

13. In a stacker, an approximately horizontal conveyer-frame hinged by its front end to upright rocking supports, a horizontal shaft, R, applied transversely to said end of said frame and having wheels, 14, relatively stationary shafts, 57 and 78, arranged beneath said frame adjacent to said shaft, R, and provided with wheels, 76 and 79, and wheels, 16, at the opposite end of said frame, and endless chains, 15, extending over said wheels, 14, thence over said frame and over said wheels, 16, and thence beneath said frame and over the wheels, 76, and thence forward over the wheels, 79, and thence downward a short distance beneath the wheels, 79, and thence up to the wheels, 14, and mechanism for driving said shaft, 57, substantially as described.

14. In a stacker, an approximately horizontal conveyer-frame hinged by one end to upright rocking supports, a horizontal shaft, R, applied transversely to said end of said frame and having wheels, 14, relatively stationary shafts, 57 and 78, arranged beneath said frame adjacent to said shaft, R, and provided with wheels, 76 and 79, and wheels, 16, at the opposite end of said frame, and endless chains, 15, extending over said wheels, 14, thence over said frame and over said wheels, 16, and thence beneath said frame and over the wheels, 76, and thence forward over the wheels, 79, and thence downward a short distance beneath the wheels, 79, and thence up to the wheels, 14, and two-speed driving mechanism applied to said shaft, 57, substantially as described.

15. In a stacker, the combination with an approximately horizontal conveyer-frame hinged at its front end, of approximately upright supports at the rear end of said frame, chains extending from said supports to said conveyer-frame, a transverse rotary shaft resting in bearings in said frame, wheels surrounding and fixed to said shaft and engaging said chains, wheels loosely surrounding said shaft, conveyer-chains surrounding said wheels, and speed-reducing gearing intervening between one of said conveyer-chain wheels and said transverse shaft, substantially as described.

16. In a stacker, the combination with an approximately horizontal conveyer-frame hinged at its front end, of approximately upright supports at the rear end of said frame, chains extending from said supports to said conveyer-frame, a transverse rotary shaft resting in bearings in said frame, wheels surrounding and fixed to said shaft and engaging said chains, wheels loosely surrounding said shaft, conveyer-chains surrounding said wheels, speed-reducing gearing intervening between one of said conveyer-chain wheels and said transverse shaft, and manual mechanism for interrupting the operation of said intervening gearing, substantially as described.

17. In a stacker, the combination with an approximately horizontal conveyer-frame hinged at its front end, of approximately upright supports at the rear end of said frame, chains extending from said supports to said conveyer-frame, a transverse rotary shaft resting in bearings in said frame, wheels surrounding and fixed to said shaft and engaging said chains, wheels loosely surrounding said shaft, conveyer-chains surrounding said wheels, speed-reducing gearing intervening between one of said conveyer-chain wheels and said transverse shaft, and brake mechanism applied to said transverse shaft, substantially as described.

18. In a stacker, the combination with an approximately horizontal conveyer-frame hinged at its front end, of approximately upright supports at the rear end of said frame, chains extending from said supports to said conveyer-frame, a transverse rotary shaft resting in bearings in said frame, wheels surrounding and fixed to said shaft and engaging said chains, wheels loosely surrounding said shaft, conveyer-chains surrounding said wheels, speed-reducing gearing intervening between one of said conveyer-chain wheels and said transverse shaft, brake mechanism applied to said transverse shaft and mechanism for interrupting the operation of said intervening gearing, substantially as described.

19. In a stacker, the combination with an approximately horizontal conveyer-frame hinged at its front end, of relatively stationary supports at the rear end of said frame, a rotary shaft journaled transversely across the rear end of said frame, wheels, 16, loosely surrounding said shaft, a spur gear-wheel loosely surrounding said shaft and joined to one of said wheels, 16, a counter-shaft parallel to said transverse shaft, a relatively large gear-wheel surrounding and fixed to said counter-shaft and engaging said first-mentioned gear-wheel, a smaller gear-wheel surrounding and fixed to said counter-shaft, a relatively large gear-wheel surrounding and fixed to said transverse shaft and engaging the last-mentioned gear-wheel, lifting-chains secured to said conveyer-frame and said supports, and wheels surrounding and fixed to said transverse shaft and in operative relation with said lifting-chains, substantially as described.

20. In a stacker, the combination with an approximately horizontal conveyer-frame hinged at its front end, of relatively stationary supports at the rear end of said frame, a rotary shaft journaled transversely upon the rear end of said frame, conveyer-chain wheels loosely surrounding said shaft, conveyer-chains surrounding said wheels, a gear-wheel loosely surrounding said shaft and joined to one of said conveyer-chain wheels, a counter-shaft parallel to said transverse shaft and having one of its bearings shiftable, a relatively large gear-wheel surrounding and fixed upon said counter-shaft and engaging said gear-wheel on said transverse shaft, a relatively small gear-wheel surrounding and fixed upon said counter-shaft, a relatively large gear-wheel surrounding and fixed upon said transverse shaft and in engagement with the last-mentioned gear-wheel on said counter-shaft, and mechanism for shifting the shiftable end of said counter-shaft for the engagement and disengagement of the gear-wheel upon that end of said shaft, substantially as described.

21. In a stacker, the combination with an approximately horizontal conveyer-frame hinged at its front end, of relatively stationary supports at the rear end of said frame, a rotary shaft journaled transversely upon the rear end of said frame, conveyer-chain wheels loosely surrounding said shaft, conveyer-chains surrounding said wheels, a gear-wheel loosely surrounding said shaft and joined to one of said conveyer-chain wheels, a counter-shaft parallel to said transverse shaft and having one of its bearings shiftable, a relatively large gear-wheel surrounding and fixed upon said counter-shaft and engaging said gear-wheel on said transverse shaft, a relatively small gear-wheel surrounding and fixed upon said counter-shaft, a relatively large gear-wheel surrounding and fixed upon said transverse shaft and in engagement with the last-mentioned gear-wheel on said counter-shaft, and a pitman, crank, rock-shaft, and hand-lever for shifting the shiftable end of said counter-shaft, substantially as described.

22. In a stacker, the combination with a conveyer-frame hinged by its front end, of supports adjacent to the rear end of said frame, lifting mechanism intervening between said conveyer-frame and said supports, a rock-shaft in operative relation with said intervening mechanism for controlling the latter, stop mechanism for arresting the delivery from said conveyer-chains, and a hand-lever in operative relation with said stop mechanism and with said intervening mechanism, substantially as described.

23. In a stacker, the combination with an approximately horizontal conveyer-frame, of conveyer-chains, upright stop-bars adjacent to the rear end of said frame, arms, 115, rock-shaft, 113, and crank, 112, substantially as described.

24. In a stacker, the combination with an approximately horizontal conveyer-frame, of conveyer-chains, upright stop-bars adjacent to the rear end of said frame, arms, 115, rock-shaft, 113, and crank, 112, and a hand-lever in operative relation with said crank, substantially as described.

25. In a stacker, the combination with an approximately horizontal conveyer-frame, of conveyer-chains, upright stop-bars adjacent to the rear end of said frame, arms, 115, rock-shaft, 113, and crank, 112, and automatic mechanism for lifting the rear end of said conveyer-frame, and a hand-lever in operative relation with said lifting mechanism and with said rock-shaft, substantially as described.

26. In a stacker, the combination with an approximately horizontal conveyer-frame hinged at its front end, of automatic lifting and lowering mechanism at the rear end of said frame, and automatic brake mechanism for retarding said lifting and lowering mechanism, substantially as described.

27. In a stacker, the combination with an approximately horizontal conveyer-frame hinged at its front end, of conveyer-chains applied to said frame, lifting and lowering mechanism in operative relation with one of said chains, and automatic brake mechanism for retarding said lifting and lowering mechanism, substantially as described.

28. In a stacker, the combination with an approximately horizontal conveyer-frame hinged at its front end, of conveyer-chains applied to said frame, lifting and lowering mechanism in operative relation with one of said chains, automatic brake mechanism for retarding said lifting and lowering mechanism, and a hand-lever in operative relation with said lifting mechanism for interrupting the operation of the latter, substantially as described.

29. In a stacker, the combination with an approximately horizontal conveyer-frame hinged at its front end, of supports adjacent to the rear end of said frame, a rotary shaft arranged transversely upon said frame, adjacent to said supports, wheels upon said shaft, mechanism for rotating said shaft, lifting-chains each secured by one end to said frame and extending thence upward over a pulley in one of said supports and thence downward around said wheels on said shaft and thence upward over another pulley on said support and thence downward around a pulley on a weight and thence upward to said support, substantially as described.

30. In a stacker, the combination with an approximately horizontal conveyer-frame hinged at its front end, of supports adjacent to the rear end of said frame, conveyer-chains applied to said frame, a rotary shaft arranged transversely upon said frame adjacent to said supports, wheels upon said shaft, mechanism in operative relation with one of said chains and said shaft for transmitting power from said chain to said shaft at a reduced speed, lifting-chains, each of which is secured by one end to said frame and extends thence upward over a pulley on one of said supports and thence downward around said wheels on said shaft and thence upward over another pulley on said support and thence downward around a pulley on a weight and thence upward to said support, substantially as described.

31. In a stacker, the combination with an approximately horizontal conveyer-frame hinged at its front end, of supports adjacent to the rear end of said frame, a rotary shaft arranged transversely upon said frame adjacent to said supports, wheels upon said shaft, mechanism for rotating said shaft, lifting-chains each secured by one end to said frame and extending thence upward over a pulley on one of said supports and thence downward around said wheels on said shaft and thence upward over another pulley on said support and thence downward around a pulley on a weight and thence upward to said support, a wheel surrounding and fixed upon said shaft, a brake-strap mounted upon said frame and surrounding said wheel, and a tension-lever applied to said brake-strap, substantially as described.

32. In a stacker, the combination with an approximately horizontal conveyer-frame hinged at its front end, of supports adjacent to the rear end of said frame, conveyer-chains applied to said frame, a rotary shaft arranged transversely upon said frame adjacent to said supports, wheels upon said shaft, mechanism in operative relation with one of said chains and said shaft for transmitting power from said chain to said shaft at a reduced speed, lifting-chains, each of which is secured by one end to said frame and extends thence upward over a pulley on one of said supports and thence downward around said wheels on said shaft and thence upward over another pulley on said support and thence downward around a pulley on a weight and thence upward to said support, a wheel surrounding and fixed upon said shaft, a brake-strap mounted upon said frame and surrounding said wheel, and a tension-lever applied to said brake-strap, substantially as described.

33. In a stacker, the combination with front and rear supports, of a conveyer-frame hinged to the front supports and slidably secured to the rear supports and embodying bars or beams, 35, 36, 51, 42, and 51$^a$, and flooring, 50 and 53, substantially as described.

34. In a stacker, the combination with front and rear supports, of a conveyer-frame hinged to the front supports and slidably secured to the rear supports and embodying bars or beams, 35, 36, 51, 42, and 51$^a$, and flooring, 50 and 53, and spacing-stick guides applied to the opposing faces of said beams, 36 and 42, substantially as described.

35. In a stacker, the combination with front and rear supports, of a conveyer-frame hinged to said front supports, an upright bar or plate, 26, placed adjacent to each rear support, guide members, 31, applied to the lower end of each plate, 26, and extending along an adjacent face of one of said rear supports, bars or beams, 35 and 36, secured to said guide members, and beams, 51, 42, and 51$^a$, substantially as described.

36. In a stacker, the combination with front and rear supports, of a conveyer-frame hinged to said front supports, an upright bar or plate, 26, placed adjacent to each rear support, guide members, 31, applied to the lower end of each plate, 26, and extending along an adjacent face of one of said rear supports, bars or beams, 35 and 36, secured to said guide members, and beams, 51, 42, and 51$^a$, and spacing-stick guides applied to the opposing faces of said beams, 36 and 42, substantially as described.

37. In a stacker, the combination with front and rear supports, of an approximately horizontal conveyer-frame comprising a transverse rotary shaft, an upright plate, 26, applied against one of the faces of each of said rear supports, guide members secured to opposite faces of said plate, 26, and extending along opposite sides of the adjacent rear support and having bearings in which said transverse shaft rests, substantially as described.

38. In a stacker, the combination with front and rear supports, of an approximately horizontal conveyer-frame comprising a transverse rotary shaft, an upright plate, 26, applied against one of the faces of each of said rear supports, guide members secured to opposite faces of said plate, 26, and extending along opposite sides of the adjacent rear support and having bearings in which said transverse shaft rests, and guide-plates, 27, applied to the upper portion of said plate, 26, at opposite sides of the latter and extending across and beyond the adjacent faces of the adjacent rear support, and a guide-roller journaled between the projecting ends of said plates and bearing against the adjacent face of the adjacent rear support, substantially as described.

39. In a stacker, the combination with a conveyer-frame and conveyer mechanism, of straightening mechanism adapted to engage and hold the lumber when presented obliquely and release the same when it becomes substantially transverse to the conveyer-frame, substantially as described.

40. In a stacker, the combination with a conveyer-frame and conveyer mechanism, of an arresting device normally standing in the path of the lumber, a yielding device normally standing in the path of the lumber forward and laterally of said arresting device and in operative relation therewith for the depression of the latter when said yielding device yields to the pressure of the advancing lumber, substantially as described.

41. In a stacker, the combination with a conveyer-frame and conveyer mechanism, of a hinged straightener comprising a hook and an oblique finger, both extending normally into the path of the lumber, and said finger being forward and laterally of said hook, substantially as described.

42. In a stacker, the combination with a conveyer-frame and conveying mechanism, of a bracket, a straightener hinged to said bracket, said straightener comprising a hook and an oblique finger normally extending into the path of the lumber and said finger being located forward and laterally of said hook, substantially as described.

43. In a stacker, the combination with a conveyer-frame and conveying mechanism, of a hinged straightener, said straightener comprising a weighted arm, a hook, and an oblique finger, said hook and finger normally extending into the path of the lumber and said finger being located forward and laterally of said hook, substantially as described.

44. In a stacker, the combination with a conveyer-frame and conveying mechanism, of a bracket, a hinged straightener comprising a weighted arm, a hook, and an oblique finger, said hook and finger normally extending into the path of the lumber and said finger being located forward and laterally of said hook, substantially as described.

In testimony whereof I have signed my name, in presence of two witnesses, this 19th day of August, 1904.

GEORGE W. SOULÉ.

Witnesses:
M. E. GULLETT,
WALTER G. HODGES.